(12) United States Patent
Lien

(10) Patent No.: US 7,529,002 B2
(45) Date of Patent: May 5, 2009

(54) OPTICAL PATH DEVICE

(76) Inventor: Chin-Chung Lien, No. 1-1, R&D Rd. 2, Science-Based Industrial Park, Hsi Chih (TW)

( * ) Notice: Subject to any disclaimer, the term of this patent is extended or adjusted under 35 U.S.C. 154(b) by 979 days.

(21) Appl. No.: 10/623,597

(22) Filed: Jul. 22, 2003

(65) Prior Publication Data

US 2004/0125418 A1    Jul. 1, 2004

(30) Foreign Application Priority Data

Oct. 23, 2002    (TW) .............................. 91216964 U

(51) Int. Cl.
*H04N 1/04*    (2006.01)
(52) U.S. Cl. .................. 358/496; 358/481; 358/494; 358/474
(58) Field of Classification Search .............. 358/496, 358/481, 494, 474; 359/861, 862
See application file for complete search history.

(56) References Cited

U.S. PATENT DOCUMENTS 5,027,424 A * 6/1991 Yamazaki et al. ........... 382/321
5,687,007 A * 11/1997 Yamazaki et al. ........... 358/474
5,895,914 A * 4/1999 Tsai ........................... 250/234
5,973,815 A * 10/1999 Schissler et al. ............ 359/212
6,144,475 A * 11/2000 Sheng ........................ 359/196
6,456,412 B1 * 9/2002 Shyu .......................... 359/196
6,582,088 B2 * 6/2003 Hung ......................... 359/861
7,123,389 B2 * 10/2006 Yui ............................ 358/496

FOREIGN PATENT DOCUMENTS

TW    342455    *    8/1997

\* cited by examiner

*Primary Examiner*—Houshang Safaipour
(74) *Attorney, Agent, or Firm*—Stolowitz Ford Cowger LLP

(57) ABSTRACT

An optical path device composed of four pieces of reflected mirrors is disclosed. In the optical path device, after being reflected many times between a set of two parallel mirrors, an incident light not perpendicular to the surface of the original document is turned by an optical path turning mirror to enter the parallel mirrors set again and reflected many times, and then the incident light is reflected into a lens and is imaged on a charge coupled device (CCD). The optical path device can limit the optical path between the parallel mirrors set effectively, thereby decreasing the volume of a chassis.

24 Claims, 4 Drawing Sheets

US 7,529,002 B2

OPTICAL PATH DEVICE

FIELD OF THE INVENTION

The present invention relates to an optical path device, and more particularly, to an optical path device that has four pieces of reflection mirrors and has a great capacity of optical path.

BACKGROUND OF THE INVENTION

Optical device, such as optical scanner, employs an optical path folding device to reflect an incident light to a lens for forming a light image signal, and uses a charge coupled device (CCD) to covert the light image signal to electronic signals for being stored and processed in electric devices. Optically, it needs a certain length of optical path to form a clear light image. In order to reduce the size of an optical device, the conventional optical path device usually has several reflection mirrors to fold optical paths. Hence, the number, size, and relative positions of the reflection mirrors of the optical path device directly affect the size and weight of the optical path device, and indirectly affect the size and weight of an optical device.

A conventional optical scanner usually has four pieces of reflection mirrors, and each reflection mirrors reflects an incident light projected by a light source before the light is focused and reaches a charge coupled device. However, under the influence resulted from the tendency of compact and light-weighted electronic products, the requirements of volume and weight for the electronic products are raised increasingly. Therefore, how to effectively reduce the size and weight of an optical path device, and increase the flexibility for fitting various lenses to make optical devices gain great volume efficiency, has become a very important subject in the current optical device industry.

SUMMARY OF THE INVENTION

One major purpose of the present invention is to provide an optical path folding device. The optical path folding device only uses four pieces of reflection mirrors to contain a very long optical path, and change the reflection numbers of the incident light to adjust the length of optical path by adjusting the incident angle of light, the angle of an optical path turning mirror, or the distance between parallel mirrors. Therefore, the optical path folding device can fit lenses having various optical paths easily.

Another purpose of the present invention is to provide an optical path device. The optical path device can limit optical path between parallel mirrors effectively, and the shape of the chassis cooperating with the optical path device is rectangular, thereby enhancing the volume efficiency of a scanner and reducing the volume of the chassis efficiently.

Still another purpose of the present invention is to provide an optical path device having a set of parallel mirrors, and multi-reflection of light just occurs between the set of parallel mirrors. Therefore, the problem of the light energy decay can be improved effectively by only increasing the reflectivity of the set of parallel mirrors.

Yet another purpose of the present invention is to provide an optical path device comprising four pieces of reflection mirrors. In the optical path device, multi-reflection of light just occurs between two parallel mirrors, so that the accuracy for machining and forming the optical path device is much easily to be controlled, and the optical path device is quite easy to be fabricated and produced.

According to the aforementioned purposes, the present invention further provides an optical path device, which is installed in an optical device, such as an optical scanner, and the optical device comprises an original document surface used for depositing a document desired to be scanned, the optical path device comprising: a light source, used to provide the optical path device an incident light; a reflection unit, used to reflect the incident light, wherein the reflection unit comprises a parallel mirror set including a first reflection mirror and a second reflection mirror, a third reflection mirror, and a fourth reflection mirror, and the parallel mirror set is parallel to the original document surface; a lens, used to focus the incident light reflected by the reflection unit to form an imaging signal; and a charge coupled device (CCD), used to covert the imaging signal produced by the lens into an electronic signal.

An optical path of the incident light provided by the light source is in sequence: the light source-the original document surface-the parallel mirror set-the third reflection mirror-the parallel mirror set-the fourth reflection mirror-the lens.

By adjusting the incident angle between the incident light and the original document surface, the included angle between the third reflection mirror and the parallel mirror set, or the distance between the two parallel mirrors, the reflection number of the incident light between the two parallel mirrors can be controlled, thereby obtaining the purpose of controlling the total length of optical path and making the optical path device of the present invention meeting the needs of lenses having various optical paths.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention discloses an optical path device having four pieces of reflection mirrors, limiting optical paths between a parallel mirror set that is parallel to an original document surface, and using an optical path turning mirror to make an incident light projected from the parallel mirror set to be reflected to the parallel mirror set again so as to perform multi-reflection. Therefore, the optical path device can contain very long optical path, thereby achieving a purpose of reducing the volume of a chassis. In order to make the illustration of the present invention more explicitly and completely, the following description and the drawings from FIG. 1 to FIG. 4b are stated.

Figure 1:
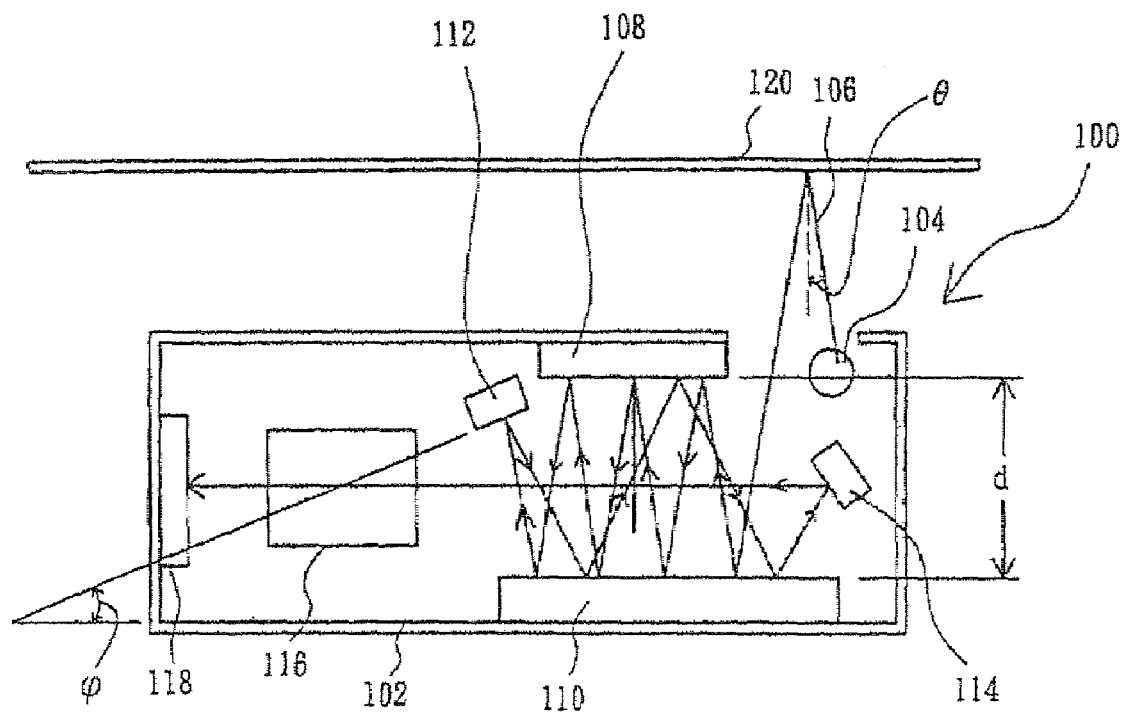
FIG. 1 illustrates a cross-sectional view of an optical path device according to a preferred embodiment of the present invention.

Referring to FIG. 1, FIG. 1 illustrates a cross-sectional view of an optical path device according to a preferred embodiment of the present invention. An optical path device 100 of the present invention is installed on a chassis 102 of, for example, an optical scanner. The optical path device 100 comprises a light source 104, a reflection unit, a lens 116, and a charge coupled device 118, wherein the reflection unit is composed of four pieces of reflection mirrors, i.e. a reflection mirror 108, a reflection mirror 110, a reflection mirror 112, and a reflection mirror 114. In a preferred embodiment of the present invention, a reflection surface of the reflection mirror 108 and a reflection surface of the reflection mirror 110 are opposite to each other and parallel, thereby forming a parallel mirror set, wherein the reflection mirror 108 and the reflection mirror 110 are separated by a distance d, and the reflection mirror 108 and the reflection mirror 110 can be parallel to an original document surface 120 used to deposit a document desired to be scanned. In addition, the reflection mirror 112 is located between one end of the lens 116 and one end of the parallel mirror set, and an included angle φ ranging from 0 degree to 180 degrees exists both between the reflection mirror 112 and one parallel surface of the reflection mirror 108, and between the reflection mirror 112 and the reflection mirror 110 of the parallel mirror set. The light source 104 and the reflection mirror 114 are at the other end of the parallel mirror set, wherein an incident angle θ greater than 0 exists between an incident light 106 projected by the light source 104 and the original document surface 120. The charge coupled device 118 is at the other end of the lens 116.

After the light source 104 projects the incident light 106, the incident light 106 is projected to the original document surface 120 with the incident angle θ, and is reflected by the original document surface 120 to the reflection surface of the reflection mirror 110 of the parallel mirror set with a reflection angle the same as the incident angle θ. After being projected into the parallel mirror set, the incident light 106 is reflected several times between the reflection mirror 110 and the reflection mirror 108, and then is reflected to the reflection mirror 112. The reflection mirror 112 is also called an optical path turning mirror or an optical path reversing mirror, which is used to reflect and turn the incident light 106 projected from the parallel mirror set, so as to make the incident light 106 inject to the reflection mirror 110 of the parallel mirror set and be reflected several times between the reflection mirror 110 and the reflection mirror 108 again. After being reflected several times in the parallel mirror set, the incident light 106 is reflected to the reflection mirror 114, wherein the reflection mirror 114 is also called an imaging mirror. After being reflected by the reflection mirror 114, the incident light 106 is injected to the lens 116, and then converged and imaged on the charge coupled device 118. Briefly, the path of the incident light 106 is in sequence: the light source 104-the original document surface 120-the parallel mirror set (the reflection mirror 110-the reflection mirror 108)-the reflection mirror 112-the parallel mirror set (the reflection mirror 110-the reflection mirror 108)-the reflection mirror 114-the lens 116-the charge coupled device 118, wherein, according to the optical path of the incident light 106 in the reflection unit, the shape of the chassis 102 can be, for example, rectangular.

One feature of the present invention is that: by using the reflection mirror 112 for optical path reversing, the incident light 106 can be reflected several times in the parallel mirror set again. Therefore, a longer optical path can be obtained while the volume of optical device 100 is smaller, thereby obtaining high volume efficiency and achieving the purpose of reducing the volume of the chassis 102.

Another feature of the present invention is that: by using the parallel mirror set and the reflection mirror 112, the optical path of the incident light 106 is limited between the reflection mirror 108 and the reflection mirror 110, and most of the reflections of the incident light 106 fall on the reflection mirror 108 and the reflection mirror 110. Hence, only the reflection mirror 108 and the reflection mirror 110 with higher reflectivity have to be used, for effectively resolving the problem of the light energy decay, thereby maintaining the energy intensity of light.

Figure 2A:
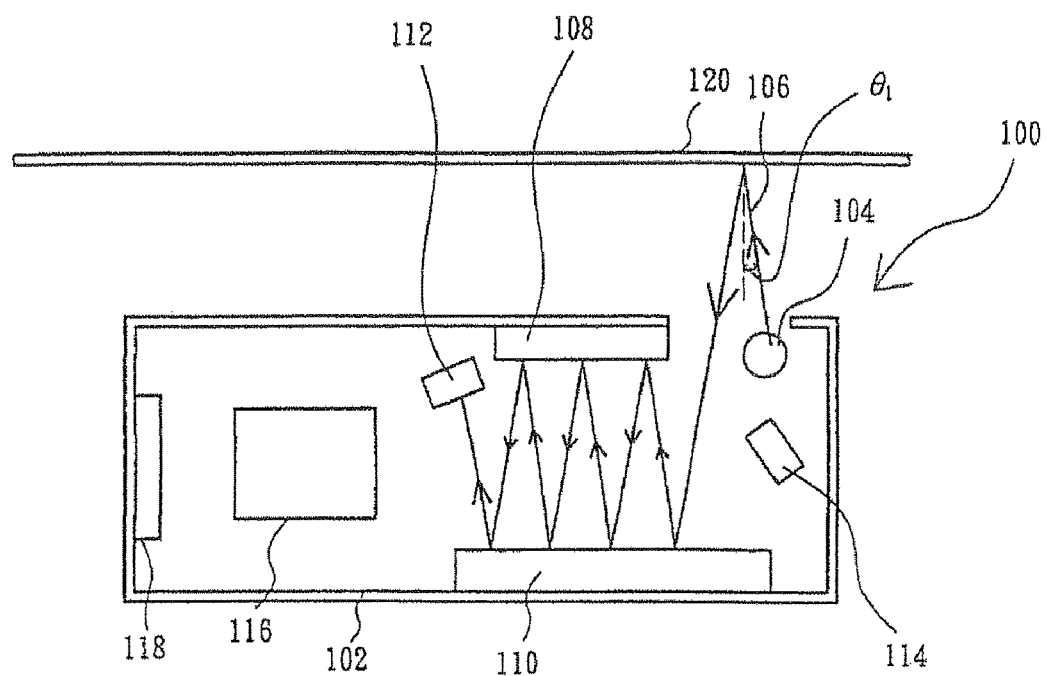
FIG. 2a and FIG. 2b illustrate a diagram showing a preferred embodiment of the present invention by adjusting the incident angle of light to control the reflection number between a parallel mirror set of an optical path device.
Figure 2B:
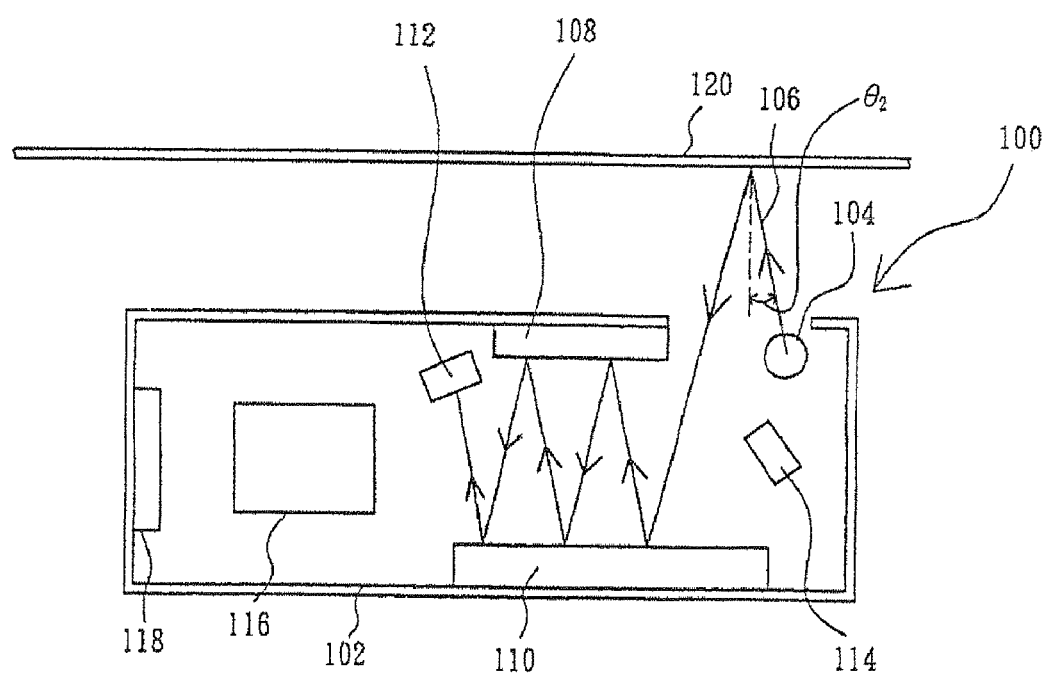

Referring to FIG. 2a and FIG. 2b, FIG. 2a and FIG. 2b illustrate a diagram showing a preferred embodiment of the present invention by adjusting the angle of an incident light to control the reflection number between a parallel mirror set of an optical path device. In order to illustrate clearly the influence on the reflection times of the incident light 106 in the parallel mirror set by adjusting the incident angle of the incident light 106, the paths of the incident light 106 after being reflected by the reflection mirror 112 in FIG. 2a and FIG. 2b are not shown. The incident angle $\theta_1$ between the incident light 106 and the original document surface 120 in FIG. 2a is smaller the incident angle $\theta_2$ between the incident light 106 and the original document surface 120 in FIG. 2b. When the incident light 106 is projected into the parallel mirror set after being reflected by the original document surface 120, and is reflected several times in the parallel mirror set, the incident angle $\theta_1$ in FIG. 2a is smaller than the incident angle $\theta_2$ in FIG. 2b, and the original document surface 120 is parallel to the reflection mirror 108 and the reflection mirror 110, so that the angle of the incident light 106 projected to the reflection mirror 110 in FIG. 2a is also smaller than that of the incident light 106 projected to the reflection mirror 110 in FIG. 2b, whereby the number of the incident light 106 reflected in the parallel mirror set in FIG. 2a is larger than that of the incident light 106 reflected in the parallel mirror set in FIG. 2b. Therefore, the optical path of the incident light 106 in FIG. 2a is longer than that of the incident light 106 in FIG. 2b.

Figure 3A:
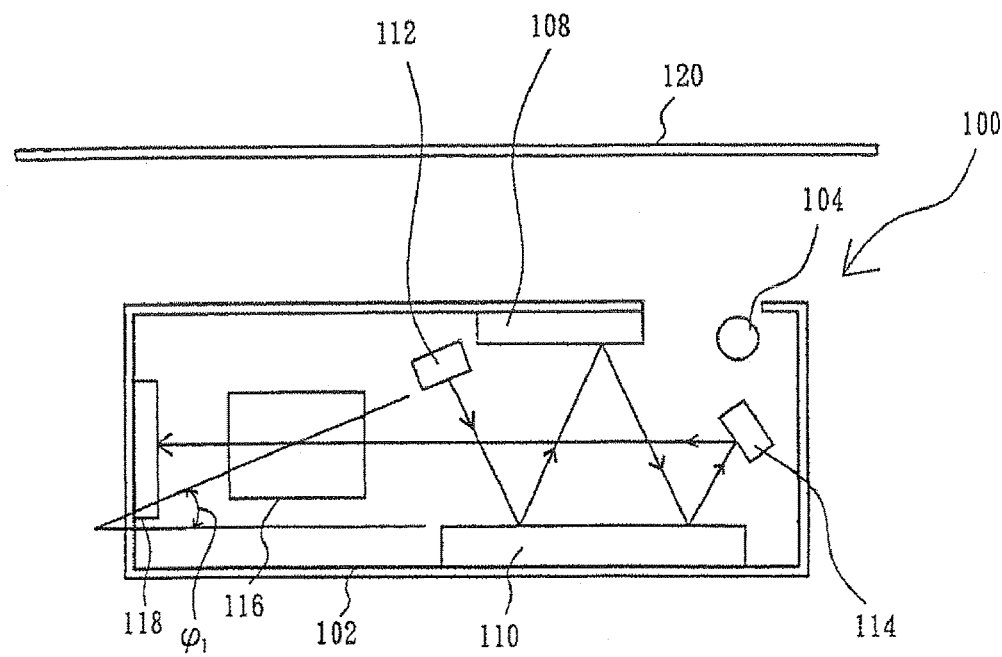
FIG. 3a and FIG. 3B illustrate a diagram showing a preferred embodiment of the present invention by adjusting an optical path turning mirror to control the reflection number between a parallel mirror set of an optical path device.
Figure 3B:
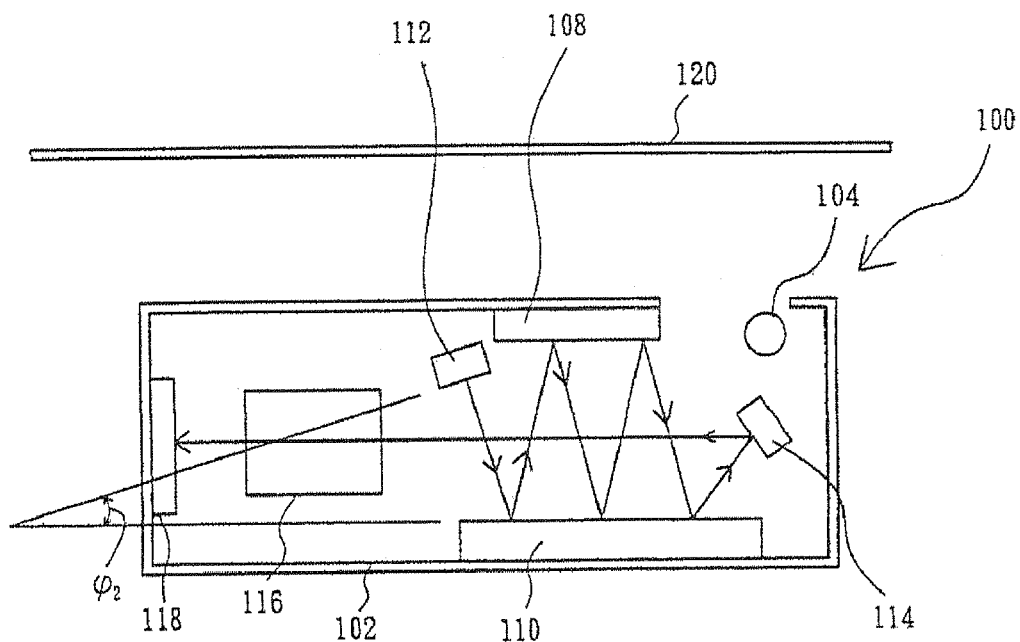

Referring to FIG. 3a and FIG. 3b, FIG. 3a and FIG. 3B illustrate a diagram showing a preferred embodiment of the present invention by adjusting an optical path turning mirror to control the reflection number between a parallel mirror set of an optical path device according. In order to illustrate clearly the influence on the reflection times of the incident light 106 in the parallel mirror set by adjusting the optical path turning mirror, the paths of the incident light 106 between the light source 104 and the reflection mirror 112 in FIG. 3a and FIG. 3b are not shown. The included angle $\phi_1$ between the reflection mirror 112 for turning optical path and one parallel surface of the parallel mirror set in FIG. 3a is greater than the included angle $\phi_2$ between the reflection mirror 112 and one parallel surface of the parallel mirror set in FIG. 3b. After the incident light 106 is reflected and projected to the reflection mirror 112 by the parallel mirror set, because the included angle $\phi_1$ in FIG. 3a is greater than the included angle $\phi_2$ in FIG. 3b, the reflection number of the incident light 106 in parallel mirror set in FIG. 3a is less than that of the incident light 106 in parallel mirror set in FIG. 3b, when the incident light 106 is reflected and projected into the parallel mirror set again by the reflection mirror 112. Therefore, the optical path in FIG. 3a is shorter than that in FIG. 3b.

Figure 4A:
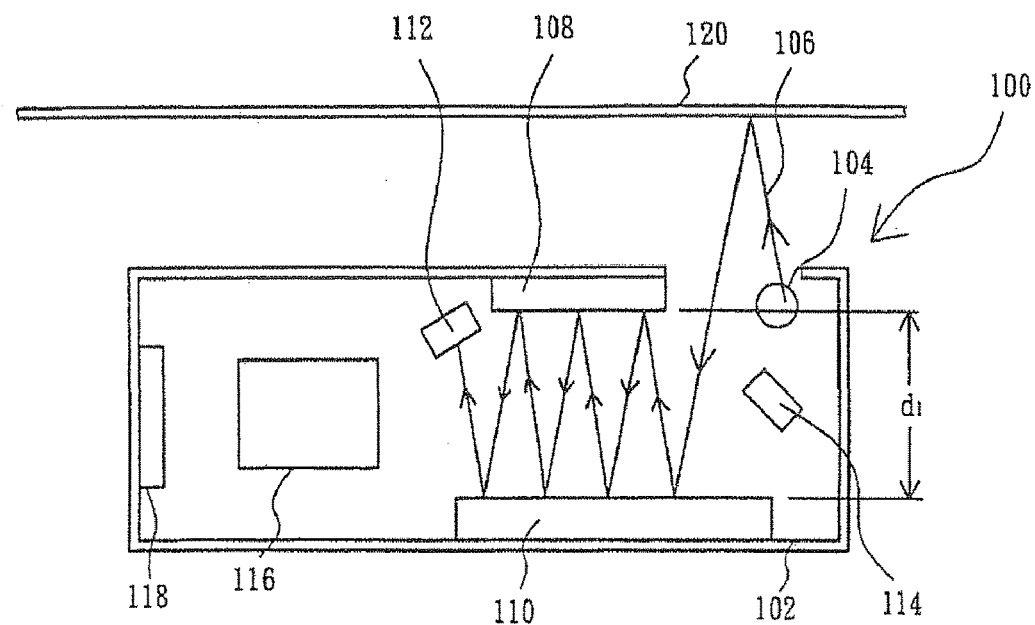
FIG. 4a and FIG. 4b illustrate a diagram showing a preferred embodiment of the present invention by adjusting the distance between a parallel mirror set of an optical path device to control the reflection number between the parallel mirror set.
Figure 4B:
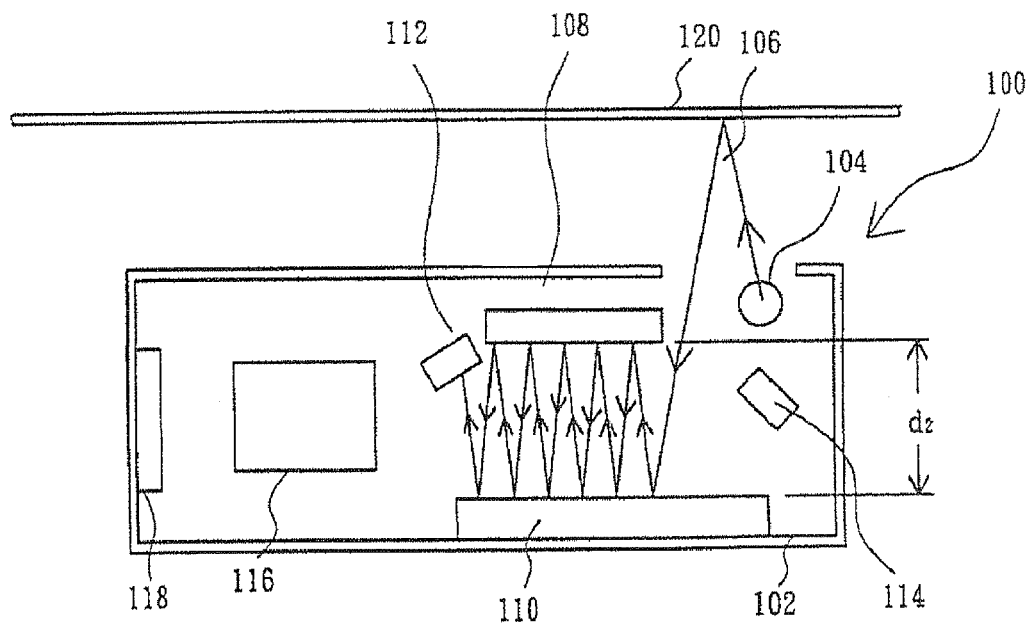

Referring to FIG. 4a and FIG. 4b, FIG. 4a and FIG. 4b illustrate a diagram showing a preferred embodiment of the present invention by adjusting the distance between a parallel mirror set of an optical path device to control the reflection number between the parallel mirror set. In order to illustrate clearly the influence on the reflection times of the incident light 106 in the parallel mirror set by adjusting the distance between the parallel mirror set, the paths of the incident light 106 after being reflected by the reflection mirror 112 in FIG. 4a and FIG. 4b are not shown. The distance $d_1$ between the reflection mirror 108 and the reflection mirror 110 of the parallel mirror set in FIG. 4a is larger than the distance $d_1$ between the reflection mirror 108 and the reflection mirror 110 in FIG. 4b. Therefore, the reflection number of the incident light 106 in the parallel mirror set in FIG. 4b is greater than that of the incident light 106 in the parallel mirror set in FIG. 4a. Accordingly, the optical path in FIG. 4a is shorter than that in FIG. 4b.

Still another feature of the present invention is that the length of the total optical path can be controlled by adjusting the incident angle $\theta$ of the incident light 106, the included angle $\phi$ between the reflection mirror 112 for reversing optical path and one parallel surface of the parallel mirror set, or the distance d between the reflection mirror 108 and the reflection mirror 110, so as to fit the needs of various lens.

According to the aforementioned description, one advantage of the present invention is that: because the optical path device of the present invention can contain a very long optical path by merely using four pieces of reflection mirrors, and can change the reflection number of the incident light to adjust the length of optical path by adjusting the angle of an incident light, the angle of an optical path turning mirror, or the distance between parallel mirrors. Therefore, the optical path device can fit lenses having various optical paths easily.

Another advantage of the present invention is that, because the optical path device of the present invention can limit optical path between parallel mirrors effectively, and the shape of the chassis cooperating with the optical path device is rectangular, thus the volume efficiency of a scanner can be enhanced, and the volume of the chassis can be reduced efficiently.

Still another advantage of the present invention is that, because in the optical path device of the present invention, the multi-reflection of light just occurs between the parallel mirror set, thus the light energy decay problem can be improved effectively by only increasing the reflectivity of the parallel mirror set.

Yet another advantage of the present invention is that, because in the optical path device of the present invention, the multi-reflection of light just occurs between two parallel mirrors, thus the accuracy for machining and forming the optical path device is much easily to be controlled, to that the optical path device is quite easy to be fabricated and produced.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. An optical device comprising:
   a reflection unit configured to reflect an incident light from a light source, wherein the reflection unit comprises an imaging mirror, an optical path turning mirror, and a parallel mirror set including a first reflection mirror and a second reflection mirror, wherein the parallel mirror set is positioned to directly reflect the incident light received from the light source between the first reflection mirror and the second reflection mirror, wherein the first reflection mirror is configured to reflect the incident light received from the second reflection mirror to the optical path turning mirror, wherein the optical path turning mirror is positioned to reflect the incident light back to the parallel mirror set, wherein the incident light from the optical turning mirror is received by the parallel mirror set with the first reflection mirror and is reflected between the first reflection mirror and the second reflection mirror; and
   a lens configured to form images by focusing the incident light reflected by the reflection unit, wherein the imaging mirror is positioned to reflect the incident light to the lens.

2. The optical device of claim 1, wherein the optical device is an optical scanner.

3. The optical device of claim 2, further comprising an original document surface configured to receive a document to be scanned, wherein the original document surface is substantially parallel to the parallel mirror set.

4. The optical device of claim 3, wherein the optical device is configured to project the incident light provided by the light source to the original document surface first and then reflect the incident light to the parallel mirror set.

5. The optical device of claim 4, wherein between the incident light and the original document surface, there is an incident angle greater than 0 degrees.

6. The optical device of claim 5, wherein when the incident angle decreases, a reflection number of the incident light reflected between the parallel mirror set increases.

7. The optical device of claim 1, wherein between the optical path turning mirror and a parallel surface of the parallel mirror set, there is an included angle between 0 degrees and 180 degrees, and wherein when the included angle decreases, a reflection number of the incident light reflected between the parallel mirror set increases.

8. The optical device claim 1, wherein between the first reflection mirror and the second reflection mirror, there is a predetermined distance, and wherein when the predetermined distance decreases, a reflection number of the incident light reflected between the parallel mirror set increases.

9. The optical device of claim 1, wherein a number of reflections of the incident light between the first reflection mirror and the second reflection mirror corresponds to at least one of an angle the incident light approaches the parallel mirror set from the light source, an angle of the optical path turning mirror relative to the parallel mirror set, or a predetermined distance between the first reflection mirror and the second reflection mirror.

10. The optical device of claim 1, wherein the parallel mirror set is configured to receive the incident light from the light source with the first reflection mirror, to reflect the incident light to the optical path turning mirror with the first reflection mirror, to receive the incident light back from the optical path turning mirror with the first reflection mirror, and to reflect the incident light to the imaging mirror with the first reflection mirror.

11. The optical device of claim 1, wherein the first reflection mirror is positioned to reflect the incident light from the optical path turning mirror to the imaging mirror.

12. An optical device comprising:
   a light source configured to provide an incident light projected to a document to be scanned on an original document surface;
   a reflection unit configured to reflect the incident light reflected from the document, wherein the reflection unit comprises an imaging mirror, an optical path turning mirror, and a parallel mirror set including a first reflection mirror and a second reflection mirror;

a lens configured to form an imaging signal by focusing the incident light reflected by the reflection unit; and an image sensor configured to convert the imaging signal into an electronic signal, wherein the reflection unit is further configured to provide an optical path for the incident light from the light source to the lens, wherein the optical path comprises, in sequence, the light source, the parallel mirror set, the optical path turning mirror, the parallel mirror set, the imaging mirror, and the lens, wherein the parallel mirror set is configured to receive the incident light from the optical turning mirror and directly reflect the incident light between the first reflection mirror and the second reflection mirror.

13. The optical device of claim 12, wherein between the incident light and the original document surface, there is an incident angle greater than 0 degrees, and wherein when the incident angle decreases, a reflection number of the incident light reflected between the parallel mirror set increases.

14. The optical device of claim 12, wherein between the optical path turning mirror and a parallel surface of the parallel mirror set, there is an included angle between 0 degrees and 180 degrees, and wherein when the included angle decreases, a reflection number of the incident light reflected between the parallel mirror set increases.

15. The optical device of claim 12, wherein between the first reflection mirror and the second reflection mirror, there is a predetermined distance, and wherein when the predetermined distance decreases, a reflection number of the incident light reflected between the parallel mirror set increases.

16. The optical device of claim 12, wherein the parallel mirror set is substantially parallel to the original document surface.

17. The optical device of claim 12, wherein a number of reflections of the incident light between the first reflection mirror and the second reflection mirror corresponds to at least one of an angle the incident light approaches the parallel mirror set from the light source, an angle of the optical path turning mirror relative to the parallel mirror set, or a predetermined distance between the first reflection mirror and the second reflection mirror.

18. The optical device of claim 12, wherein the parallel mirror set is configured to receive the incident light from the light source with the first reflection mirror, to reflect the incident light to the optical path turning mirror with the first reflection mirror, to receive the incident light back from the optical path turning mirror with the first reflection mirror, and to reflect the incident light to the imaging mirror with the first reflection mirror.

19. The optical device of claim 12, wherein the first reflection mirror is configured to reflect incident light received from the second reflection mirror to the optical path turning mirror.

20. A device, comprising:

a parallel mirror set including a first reflection mirror and configured to receive light from a light source;

an optical path turning mirror configured to receive the light from the first reflection mirror and to reflect the light back to the first reflection mirror, wherein the device is configured to reflect the light received from the optical path turning mirror between the first reflection mirror and a second reflection mirror of the parallel mirror set; and an imaging mirror configured to receive the light from the first reflection mirror and to reflect the light to an image sensing device.

21. The device of claim 20, wherein the device is configured to reflect the light from the light source from a document to the imaging mirror.

22. The device of claim 20, wherein a number of light reflections between the first reflection mirror and the second reflection mirror corresponds to an angle by which the light approaches the parallel mirror set from the light source.

23. The device of claim 20, wherein a number of light reflections between the first reflection mirror and the second reflection mirror corresponds to an angle between the optical path turning mirror and a parallel surface of the parallel mirror set.

24. The device of claim 20, wherein a number of light reflections between the first reflection mirror and the second reflection mirror corresponds to a distance between the first reflection mirror and the second reflection mirror.

* * * * *

UNITED STATES PATENT AND TRADEMARK OFFICE
CERTIFICATE OF CORRECTION

| | | |
|---|---|---|
| PATENT NO. | : 7,529,002 B2 | Page 1 of 1 |
| APPLICATION NO. | : 10/623597 | |
| DATED | : May 5, 2009 | |
| INVENTOR(S) | : Chin-Chung Lien | |

It is certified that error appears in the above-identified patent and that said Letters Patent is hereby corrected as shown below:

Column 6, line 36 (Claim 8):    Delete "device" and replace with --device of--.

Signed and Sealed this

Second Day of November, 2010

David J. Kappos
*Director of the United States Patent and Trademark Office*